Figure 1:
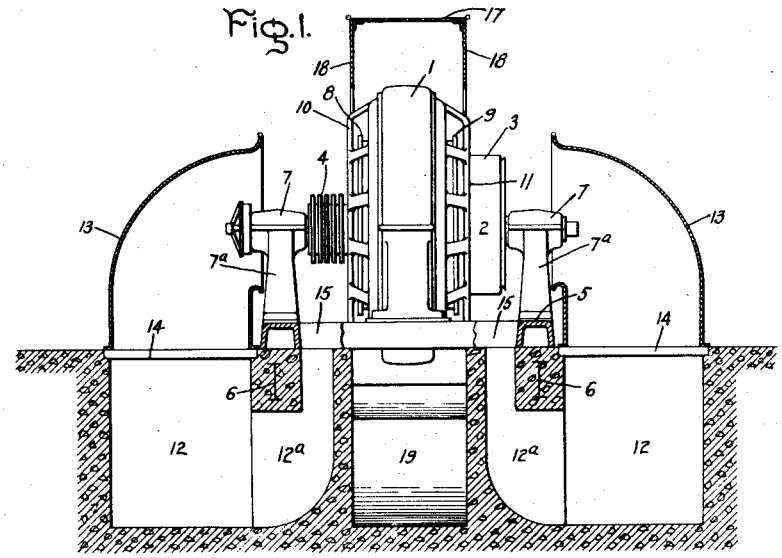

Dec. 11, 1928.

E. G. SOHLBERG 1,694,990

VENTILATION OF DYNAMO ELECTRIC MACHINES

Filed March 22, 1927       2 Sheets-Sheet 1

Inventor:
Erik G. Sohlberg,
by Alexander S. ⸺
His Attorney.

Dec. 11, 1928.                                                  1,694,990
              E. G. SOHLBERG
      VENTILATION OF DYNAMO ELECTRIC MACHINES
            Filed March 22, 1927        2 Sheets-Sheet 2

Inventor:
Erik G. Sohlberg,
by His Attorney.

Patented Dec. 11, 1928.

1,694,990

UNITED STATES PATENT OFFICE.

ERIK G. SOHLBERG, OF SCHENECTADY, NEW YORK, ASSIGNOR TO GENERAL ELECTRIC COMPANY, A CORPORATION OF NEW YORK.

VENTILATION OF DYNAMO-ELECTRIC MACHINES.

Application filed March 22, 1927. Serial No. 177,414.

My invention relates to a ventilating arrangement for dynamo-electric machines and particularly for dynamo-electric machines of the commutator type.

It has been the practice heretofore in the ventilation of dynamo-electric machines of the alternating current type, which are not provided with commutators, to place the same in ventilating casings which totally enclosed the machines and through which cooling air was circulated by means of fans. Such ventilating casings have not usually been applied to dynamo-electric machines of the commutator type, such as direct current generators and rotary converters, because it is necessary during the operation of such machines to frequently inspect and care for the commutator, as, for instance, to clean the commutator, adjust the brushes or replace some of the brushes. A totally enclosing casing hinders such inspection and care. It has therefore been the usual practice, with dynamo-electric machines of the commutator type, to place them in a station without any casing around the machine. Such machines were expected to be cooled by the natural circulation of the air through the station and by the projection of the air from the armature of the machine due to its rotation.

I have found, however, that the armatures of such dynamo-electric machines project air outwardly at the ends of the stationary member in narrow streams moving at high velocity, and that the air projected by the armature is drawn over the surfaces of the current collecting devices and forms vacuum areas at the ends of the armature, that is, areas in which the pressure is less than atmospheric. This condition results in the air which is projected outwardly by the armature at high velocity being drawn back to the vacuum areas adjacent the ends of the armature so that a large percentage of air circulating over the machine will be recirculated. It will be readily seen that such a recirculation of air through the machine will cause excessive temperatures in the machine.

In accordance with my invention, I place a casing in proximity to the armature, which collects the air thrown out from the armature on both sides thereof, using its residual velocity head as a propelling medium for removal of the heated air from the machine. The casing only extends over the magnet frame of the machine and not over the commutator, so that ready access for inspection and care may be had thereto. It will be noted that a machine built in accordance with my invention does not require any fans or air ducts therethrough in order to efficiently cool it.

Figure 2:
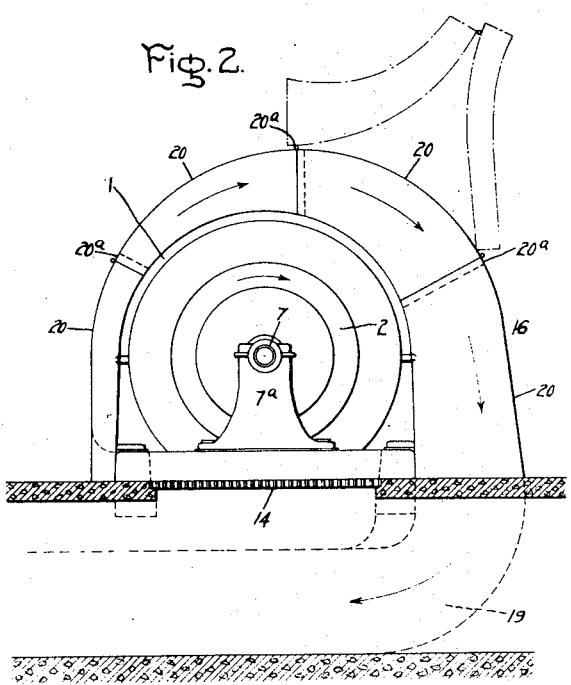
Figure 3:
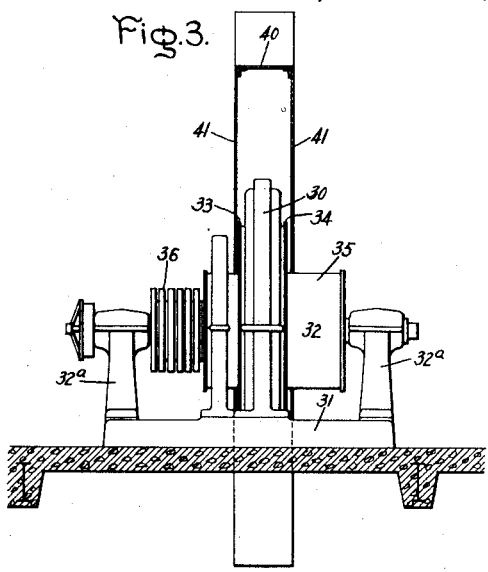
Figure 4:
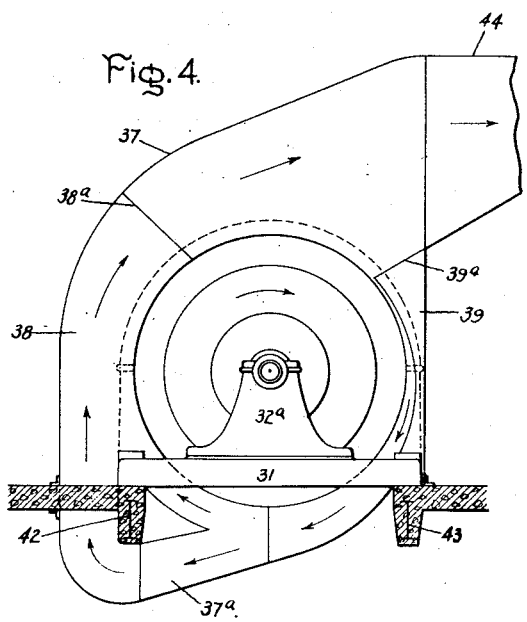

Other features of novelty of my invention are pointed out with particularity in the claims annexed to and forming a part of this specification. For a better understanding of my invention, reference may be had to the following description taken in connection with the accompanying drawing, in which Fig. 1 is a sectional view of my improved ventilating arrangement; Fig. 2 is a side elevation of the structure shown in Fig. 1 with a part removed to more clearly show the structure; Fig. 3 is a sectional view of a modified form of my ventilating construction showing the dynamo-electric machine in elevation; and Fig. 4 is a sectional view of the floor adjacent the structure shown in Fig. 3 showing the dynamo-electric machine and the ventilating casing in elevation.

Referring to Figs. 1 and 2 of the drawing, the dynamo-electric machine, in connection with which I have illustrated by invention, is the usual form of rotary converter having a stationary member 1, comprising a magnet frame and field poles attached thereto, and an armature 2 provided with current collecting means including a commutator 3 and slip rings 4. The stationary member is mounted on the base member 5 which is supported by floor beams 6, and the armature is journaled in bearings 7 of the bearing brackets 7ᵃ on the base member. The armature extends longitudinally beyond each end of the stationary member 1, as shown at 8 and 9. A casing 16 is positioned in proximity to the armature and extends over the magnet frame and beyond the outer periphery thereof. This casing does not extend substantially beyond the magnetic structure of the armature and consequently the commutator 3 and slip rings 4 project beyond the casing so that ready access thereto may be had. The armature during its rotation projects streams of air outwardly therefrom at high velocity on both sides of said magnet frame into the casing 16, without any interference by the field poles. The velocity head of the air is converted by the casing into a pressure head. Air flows over the surface of the commutator and armature and over the surface of the stationary member, removing the heat from these parts of the machine. The air thus heated is conveyed away from the dynamo-electric machine by the casing. I have found that the armature in projecting streams of air outwardly creates well-defined narrow belts of high pressure closely adjacent the magnet frame and vacuum areas at each end of the machine substantially coextensive with the area at the end of the armature. Although the vacuum areas are not as well-defined as the pressure belts, and the velocity of the air flow therethrough is for this reason very much less than the velocity of air flow through the pressure belts, yet the pressure is low enough in these vacuum areas to cause air to be drawn from about the machine to the armature. The circulation of air over the machine and into the casing 16 is greatly facilitated by supplying air to the vacuum areas through ducts 12 terminating in casings 13 having outlets that are directed toward the central portion of the end of the machine. The bearing brackets 7a shield portions at each end of the armature from the air currents discharged from the casings 13, and air is supplied to these shielded portions through openings 15 in the base member which communicate with the branches 12a of the ducts 12 between ends of the armature and the bearing brackets. In order to afford unobstructed access to the commutator and the slip rings, the casings 13, which are removably supported to gratings 14, are placed in spaced relation to the casing 16 beyond the outer edge of the base member 5, and the casing 16 is arranged so that the commutator projects therebeyond at one end and the slip rings project therebeyond at the other end.

The casing 16 is arranged about the stationary member 1 in proximity to the armature for conducting the air projected by the armature to the discharge conduit 19 through which it flows away from the dynamo-electric machine. This prevents the air projected by the armature being drawn back into the vacuum areas at the ends of the armature and recirculated through the machine which would cause high temperatures therein during its operation. In accordance with my invention, the velocity head imparted to the high velocity air streams projected by the armature is converted into a pressure head in casing 16, so that air flowing over the surface of the machine will be carried away therefrom through the casing without the use of fans. The conversion of the velocity head of the air into a pressure head in casing 16 takes place efficiently because of the shape and the arrangement of the casing. The casing is preferably volute in shape and comprises a peripheral wall 17 spaced from the stationary member to form a volute air passage between them, so that after the air streams enter the casing there is only a slight and gradual decrease in the velocity of the air as it flows to the discharge conduit 19, and as a result the velocity head losses in the casing are minimized. End walls 18 extend from the wall 17 and terminate adjacent the ends of the stationary member in spaced relation thereto for directing the high velocity air streams between the end walls and the stationary member into the casing. The spacing of the end wall relative to the stationary member is such that they closely encompass the high velocity air streams which prevents excessive eddying of the air as it enters the casing and the consequent large velocity head losses at this point. In addition to preventing velocity head losses, an important advantage of the arrangement of the end walls 18 is that the commutator projects beyond the casing at one end thereof and the slip rings project beyond the casing at the other end thereof, so that the current collecting devices are readily accessible for inspection and adjustment, as they are not enclosed by the air supply casings 13 which are placed outside of the base member 5. Inasmuch as the shape and arrangement of the casing 16 is such that the velocity head losses of the air entering and passing therethrough are small, the air projected by the armature is very effective in inducing a circulation of air from the machine through the casing. The casing preferably comprises a plurality of sectors 20 which are hinged together at 20a so that they may be swung back as shown in dotted lines in Fig. 2 when it is desired to repair the machine.

In operation of the dynamo-electric machine illustrated in Figs. 1 and 2, air is supplied through ducts 12, casings 13 and openings 15 to the vacuum areas at the ends of the machine created by the rotation of the armature. The armature which revolves, as indicated by the arrow thereon, projects the air supplied thereto at high velocity in streams through the framework of brush carrying rings 10 and 11 past each end of the stationary member 1. These high velocity air streams pass between the walls 18 and the stationary member 1 into the casing 16 and the velocity head imparted to the air by the armature is converted into a pressure head in the casing which causes air to circulate through the casing and the discharge conduit 19, as indicated by the arrows in Fig. 2, away from the dynamo-electric machine. Air is continuously circulated in this manner during the operation of the machine so that the machine is effectively cooled without the use of fans, and the recirculation of highly heated air through the machine from the high pressure belts around the machine is avoided.

As illustrated in Figs. 3 and 4 my invention is applied to a rotary converter including a stationary member 30 supported on a base member 31 and an armature 32 extending longitudinally beyond each end of the stationary member at 33 and 34 respectively. The armature is supported by bearing brackets 32ª on the base 31 and includes current collecting means consisting of a commutator 35 and slip rings 36 for connecting the machine to the direct and alternating current circuits. In this embodiment of my invention, as in the form shown in Figs. 1 and 2, the armature 32 during its rotation projects air outwardly at high velocity in narrow streams at 33 and 34 and creates well-defined high pressure belts closely adjacent the ends of the stationary member 30. The air which is projected outwardly flows from the ends of the armature over the current collecting devices and the surface of the armature thereby creating vacuum areas at the ends thereof. It will be clear, therefore, that air flowing from about the machine to these vacuum areas, over the current collecting devices and the armature and then outwardly at high velocity will effectively cool the machine if recirculation thereof through the machine is prevented. In order to prevent the flow of air from the high pressure belts to the vacuum areas and the consequent recirculation of air through the machine a volute casing 37 is arranged in proximity to the armature into which the high velocity air streams flow and in which their velocity head is transformed into a pressure head. This volute casing 37 comprises a peripheral wall 40 arranged in spaced relation to the stationary member 30 to form an air passage between the wall and the stationary and end walls 41 terminating adjacent the ends of the stationary member in spaced relation thereto for directing the high velocity air projected by the armature into the casing. The end walls 41 are so positioned that they closely encompass the high velocity air streams projected by the armature, which prevents the velocity head of the air streams being diminished by excessive eddying as they enter the casing. The position of the end walls is also such that the commutator projects beyond one of the end walls of the casing, and the slip rings project beyond the other end wall thereof, so that the commutator and the slip rings are readily accessible for inspection or adjustment. The arrangement of the end walls 41 and the volute form of the casing 37 insures the velocity head imparted to the air by the armature being efficiently transformed into a pressure head in the casing. The pressure head created in the casing causes the air to flow therethrough, as indicated by the arrows in Fig. 4, to the discharge conduit 44 and thence away from the dynamo-electric machine so that recirculation of air therethrough and consequent excessive heating are avoided. By utilizing the high velocity of the air projected by the armature to carry it therebeyond, and by proportioning the casing for converting this velocity head into pressure head in the casing, I am enabled to effectively circulate air over the surface of the machine for cooling without the use of fans, and at the same time to avoid the necessity of enclosing the current collecting means, so that they may be inspected and adjusted very readily while the machine is in operation. In this instance the dynamo-electric machine is supported on floor beams 42 and 43 and the casing 37 is branched at 37ª around the beam 42 to give the air passage the desired capacity.

In operation of the structure shown in Figs. 3 and 4 the armature 32 revolves as indicated by the arrow thereon, air is drawn from the ends of the machine over the current collecting devices and is projected from the armature in streams outwardly at high velocity past the stationary member 30. These high velocity air streams set in motion by the armature enter the casing 37, and their velocity head is transformed into a pressure head therein so that the air flows through the casing and the discharge conduit 44, as indicated by the arrows in Fig. 4, without the use of fans.

It will be seen from the foregoing description that I have produced a dynamo-electric machine in which there will be a rapid and efficient circulation of air without the use of fans or enclosing casings so that the current collecting devices will be readily accessible for inspection or adjustment while the machine is in operation.

While I have shown my invention applied to a rotary converter it is obvious that my ventilating arrangement is applicable to other types of dynamo-electric machines.

What I claim as new and desire to secure by Letters Patent of the United States is:

1. In combination, a dynamo-electric machine having a rotatable armature provided with a commutator and a stationary member surrounding said armature, said stationary member comprising a magnet frame and field poles attached thereto, said armature being adapted to project air therefrom during its rotation, and a casing in proximity to said armature extending over said magnet frame and beyond the outer periphery thereof and into which air is projected by said armature on both sides of said magnet frame without interference by said field poles, said casing having walls terminating in spaced relation to the ends of said magnet frame, the projection of air by said armature creating vacuum areas at the ends of the armature, the velocity head of said air projected by said armature being converted into a pressure head by said casing, and a second casing for supplying air to the vacuum areas at the ends of the armature, said first mentioned casing conveying the air which flows over the surfaces of the commutator and armature and over the surface of the stationary member away from said dynamo-electric machine, said casings being spaced apart so that ready access to said commutator may be had.

2. In combination, a dynamo-electric machine having a rotatable armature provided with a commutator and a stationary member surrounding said armature, said stationary member comprising a magnet frame and field poles attached thereto, said armature being adapted to project air therefrom during its rotation, and a volute casing in proximity to said armature extending over said magnet frame and beyond the outer periphery thereof and into which air is projected by said armature on both sides of said magnet frame without interference by said field poles, said casing having walls terminating in spaced relation to the ends of said magnet frame, the projection of air by said armature creating vacuum areas at the ends of the armature, the velocity head of said air projected by said armature being converted into a pressure head by said casing, and a second casing for supplying air to the vacuum areas at the ends of the armature, said volute casing conveying the air which flows over the surfaces of the commutator and armature and over the surface of the stationary member away from said dynamo-electric machine, said casings being spaced apart so that ready access to said commutator may be had.

3. In combination, a dynamo electric machine having a rotatable armature provided with a commutator and a stationary member surrounding said armature, said armature being adapted to project air therefrom during its rotation, and a casing arranged in spaced relation around said stationary member, said casing having an end wall terminating radially outward from said armature and adjacent the end of said stationary member in spaced relation thereto for deflecting the air projected by said armature into the casing for converting the velocity head imparted to the air by the armature into a pressure head in the casing which results in a flow of cooling air over the surface of said dynamo-electric machine and away therefrom through said casing, said commutator projecting beyond said casing so that ready access thereto may be had.

4. In combination, a dynamo-electric machine having a rotatable armature provided with a commutator and a stationary member surrounding said armature, said armature being adapted to project air therefrom during its rotation, and a casing comprising a plurality of sectors hinged together and arranged in spaced relation around said stationary member, said casing having an end wall terminating radially outward from said armature and adjacent the end of said stationary member in spaced relation thereto for deflecting the air projected by said armature into the casing for converting the velocity head imparted to the air by the armature into a pressure head in the casing which results in a flow of cooling air over the surface of said dynamo-electric machine and away therefrom through said casing, said commutator projecting beyond said casing so that ready access thereto may be had.

5. In combination, a dynamo-electric machine having a rotatable armature provided with a commutator and a stationary member surrounding said armature, said armature being adapted to project air therefrom during its rotation in narrow streams moving at high velocity which creates vacuum areas at the ends of the armature, means for directing air toward the vacuum areas at the ends of said armature, and a volute casing surrounding said stationary member and having walls terminating radially outward from said armature adjacent and spaced from the ends of said stationary member for deflecting the air projected by said armature into the casing for converting the velocity head imparted to the air by the armature into a pressure head in the casing which results in a flow of cooling air over the surface of said dynamo-electric machine and away therefrom through said casing, said air directing means being spaced from said casing so that ready access to said commutator may be had.

6. In combination, a dynamo-electric machine having a rotatable armature provided with a commutator and a stationary member surrounding said armature, said stationary member being provided with a base member having openings at the ends of said stationary member, said armature being adapted to project air therefrom during its rotation in narrow streams moving at high velocity which creates vacuum areas at the ends of the armature, means for supplying air to the vacuum areas at the ends of said armature and partly through the openings in said base member, and a volute casing terminating adjacent the periphery of said armature, said casing surrounding said stationary member and being spaced from the ends thereof to direct the air projected by said armature into said casing for converting the velocity head imparted to the air by the armature into a pressure head in the casing which results in a flow of cooling air over the surface of said dynamo-electric machine and away therefrom through said casing, said air directing means being spaced from said casing so that ready access to said commutator may be had.

In witness whereof, I have hereunto set my hand this 19th day of March, 1927.

ERIK G. SOHLBERG.